United States Patent [19]
Peckham

[11] Patent Number: 5,878,182
[45] Date of Patent: Mar. 2, 1999

[54] OPTICAL FIBER HAVING A LOW-DISPERSION SLOPE IN THE ERBIUM AMPLIFIER REGION

[75] Inventor: David W. Peckham, Norcross, Ga.

[73] Assignee: Lucent Technologies Inc., Murray Hill, N.J.

[21] Appl. No.: 869,390

[22] Filed: Jun. 5, 1997

[51] Int. Cl.$^6$ .................................................. G02B 6/02
[52] U.S. Cl. .......................................................... 385/123
[58] Field of Search ..................................... 385/122, 123, 385/24, 127, 141; 250/227.28; 307/3

[56] References Cited

U.S. PATENT DOCUMENTS

| | | | |
|---|---|---|---|
| 4,372,647 | 2/1983 | Okamoto et al. | 350/96.33 |
| 4,435,040 | 3/1984 | Cohen et al. | 350/96.33 |
| 4,439,007 | 3/1984 | Lazay et al. | 350/96.3 |
| 4,447,127 | 5/1984 | Cohen et al. | 350/96.33 |
| 4,691,991 | 9/1987 | Unger | 350/96.33 |
| 4,715,679 | 12/1987 | Bhagavatula | 385/127 |
| 4,852,968 | 8/1989 | Reed | 385/127 |
| 4,877,304 | 10/1989 | Bhagavatula et al. | 385/124 |
| 4,889,404 | 12/1989 | Bhagavatula et al. | 385/24 |
| 5,327,516 | 7/1994 | Chraplyvy et al. | 385/123 |
| 5,361,319 | 11/1994 | Antos et al. | 385/123 |
| 5,504,829 | 4/1996 | Evans et al. | 385/123 |
| 5,579,428 | 11/1996 | Evans et al. | 385/124 |
| 5,611,016 | 3/1997 | Fangmann et al. | 385/100 |

FOREIGN PATENT DOCUMENTS 2116744  9/1983  United Kingdom .

OTHER PUBLICATIONS

Ohashi, et al., "Disperion–Modified Single–Mode fiber By VAD Method," Transactions of The Institute of Electronics, vol. E73,. No. 4, 1 Apr. 1990.

Francois, P.L., "Propagation Mechanisms In Quadruple–Clad Fibres: Mode Coupling, Dispersion And Pure Bend Losses", *Electronics Letters*, 1983, vol. 19, No 21, pp. 8985–886.

Cohen, L.G., et al., "Tailoring The Shapes Of Dispersion Spectra To Control Bandwidths In Single–Mode Fibers", *Optics Letters*, Apr. 1982, vol. 7, No.4, pp. 183–185.

White, K. I., et al., "Zero Total Dispersion In Step–Index Monomode Fibres AT 1• 30 And 1•55 μm", *Electronics Letters*, Jun. 1979, vol. 15, No. 13, pp 396–397.

Miya, T., et al., "Fabrication Of Low Dispersion Single–Mode Fibers Over A Wide Spectral Range", *IEEE Journal Of Quantum Electronics*, Jun. 1981, vol QE–17, No. 6, pp 858–861.

Cohen, L. G., et al., "Tailoring The Shapes Of Dispersion Spectra To Control Bandwidths In Single–Mode Fibers", *Optics Letters*, Apr. 1982, vol. 7, No. 4, pp 183–185.

Okamoto, K., et al., "Dispersion Minimisation In Single–Mode Fibres Over A Wire Spectral Range", *Electronics Letters*, Oct. 25, 1979, vol. 15, No. 22, pp 729–731.

(List continued on next page.)

*Primary Examiner*—Akm E. Ullah
*Attorney, Agent, or Firm*—Michael A. Morra

[57] ABSTRACT

An optical fiber is disclosed that is suitable for use in wave-division-multiplex (WDM) systems served by Erbium-doped fiber amplifiers. The fiber has a chromatic dispersion whose absolute magnitude is at least 0.8 ps/(nm-km) over the wavelength region 1530–1565 nm, and has a dispersion slope that is less than 0.05 ps/(nm$^2$-km). This optical fiber exhibits a loss that is less than about 0.20 dB/km and is relatively insensitive to bending; moreover, its effective area exceeds 50 $\mu$m$^2$. The optical fiber includes a core of transparent material having a maximum refractive index $n_1$, and a layer of transparent cladding material on the outer surface of said core having a refractive index $n_2$. The core includes an annular region of transparent material whose minimum refractive index, $n_3$, is depressed with respect to $n_2$. These indexes are constrained by the following equations: $0.50<(n_1-n_2)/n_2<0.70$; and $-0.30<(n_3-n_2)/n_2<-0.05$.

19 Claims, 4 Drawing Sheets

OTHER PUBLICATIONS

Cohen, L. G., et al., "Radiating Leaky–Mode Losses In Single–Mode Lightguides With Depressed–Index Claddings," *IEEE Journal Of Quantum Electronics*, Oct. 1982, vol. QE–18, No. 10, pp 14667–1472.

Kawakami, S., et al., "Characteristics Of A Doubly Clad Optical Fiber With A Low–Index Inner Cladding", *IEEE Journal Of Quantum Electronics*, Dec. 1974, vol. QE–10, No. 12, pp 879–887.

Bhagavatula, V. A., et al., Dispersion–Shifted Single–Mode Fiber For High–Bit–Rate and Multiwavelength Systems, *OFC '95 Technical Digest*, Feb. 26–Mar. 3, 1995, vol 8, pp259–260.

Reed, W. A., et al., "Tailoring Optical Characteristics of Dispersion–Shifted Lightguides For Applications Near 1.55 $\mu$m", *AT&T Technical Journal*, Sep./Oct. 1986, vol. 65–5, pp 105–121.

OPTICAL FIBER HAVING A LOW-DISPERSION SLOPE IN THE ERBIUM AMPLIFIER REGION

TECHNICAL FIELD

This invention relates to optical fibers, and more particularly to fibers that are suitable for use in wave-division-multiplex (WDM) systems.

BACKGROUND OF THE INVENTION

Optical transmission has become the darling of communication technology because of the enormous bandwidth that is available on an optical fiber. Such bandwidth enables thousands of telephone conversations and hundreds of television channels to be transmitted simultaneously over a hair-thin fiber that is generally made from a high-quality glass material. Transmission capacity over an optical fiber is increased in WDM systems wherein several channels are multiplexed onto a single fiber —each channel operating at a different wavelength. However, in WDM systems, nonlinear interactions between channels, such as 4-photon mixing, severely reduces system capacity. This problem has been largely solved by U.S. Pat. No. 5,327,516 (the '516 patent), which discloses an optical fiber that reduces these nonlinear interactions by introducing a small amount of chromatic dispersion at the operating wavelengths. It is noted that as the number of WDM channels to be transmitted over a single fiber increases, so too does the optical power carried by the optical fiber. And as the power increases, so too do the nonlinear effects. Accordingly, it is desirable for an optical fiber to provide a small amount of chromatic dispersion to each of the WDM channels.

Important advances have been made in the quality of the glass material (nearly pure silica—$SiO_2$) used in making optical fibers. In 1970, an acceptable loss for glass fiber was in the range of 20 dB/km; whereas today, losses are generally below 0.25 dB/km. Indeed, the theoretical minimum loss for glass fiber is about 0.16 dB/km, and it occurs at a wavelength of about 1550 nanometers (nm). Nature appears to have smiled benignly upon optical transmission in this wavelength region because this is where Erbium-doped fiber amplifiers operate, and they have become the most practical optical amplifiers available. In such an amplifier, the Erbium ions, that the glass fiber has been doped with, are "pumped" with energy in a first wavelength region (e.g., 980 nm), and release that energy into a second wavelength region (e.g., 1530–1565 nm) when the Erbium ions are stimulated by transmitted optical signals in that second wavelength region. Such amplifiers are fundamental components in WDM systems where a broad spectrum of optical signals need to be amplified. Indeed, the transmission of one terabit per second (1 Th/s=1000 Gb/s) has already been demonstrated using twenty-five (25) adjacent channels, independent modulation of each of two polarization modes per channel, and other techniques. And while it is desirable to operate WDM systems in the 1530–1565 nm wavelength region (the Erbium amplifier region), present-day fiber designs undesirably have large differences in chromatic dispersion over the Erbium amplifier region.

Substantial effort has been devoted to the design of optical fibers having a flat dispersion characteristic across a broad wavelength region in order to accommodate transmission at both 1310 nm and 1550 nm. However, such "dispersion-flattened" fibers have achieved little or no commercial success because of excessive bending loss and tight manufacturing tolerances.

One optical fiber that provides a low-dispersion slope across the Erbium amplifier region has a refractive-index profile that resembles a donut, and it is shown at pages 259–260 of the OFC '95 Technical Digest in an article entitled: Dispersion-shifted single-mode fiber for high-bit-rate and multiwavelength systems. This design comprises a ring of high index material surrounding a core of low index material. However, the transmission loss associated with such a profile is in the order of 0.22 dB/km at 1550 nm, which is at least ten-percent (10%) higher than desirable. And while the disclosed design appears useful in providing negative chromatic dispersion with a low slope in the Erbium amplifier region, it does not appear to offer positive chromatic dispersion with a similarly low slope in the Erbium amplifier region.

Accordingly, what is desired, but does not appear to be disclosed in the prior art, is an optical fiber that is suitable for operation in the Erbium amplifier region having: (i) a transmission loss that is less than 0.22 dB/km at 1550 nm; (ii) a small amount of chromatic dispersion (i.e., an absolute magnitude of at least 0.8 ps/(nm-km)); and (iii) a chromatic dispersion characteristic having a low slope (i.e., less than 0.05 ps/($nm^2$-km)).

SUMMARY OF THE INVENTION

The problems of the prior art are overcome by an optical fiber having a chromatic dispersion whose absolute magnitude is greater than about 0.8 ps/(nm-km) for all wavelengths within the region 1530–1565 nm. The optical fiber includes a core of transparent material having a maximum refractive index $n_1$, and a layer of transparent cladding material on the outer surface of said core having a refractive index $n_2$. The core includes an annular region of transparent material whose minimum refractive index, $n_3$, is depressed with respect to $n_2$. These indexes are constrained by the following equations to provide an optical fiber having low loss and a low-dispersion slope in the wavelength region 1530–1565 nm:

$0.50 < (n_1 - n_2)/n_2 < 0.70$; and $-0.30 < (n_3 - n_2)/n_2 < -0.05$.

In one illustrative embodiment of the invention, an optical fiber having positive chromatic dispersion is disclosed. Its dispersion slope is about +0.043 ps/($nm^2$-km), over the wavelength region 1530–1565 nm, and its index profile comprises a single annular ring of fluorine-doped material between a germanium-doped central core region and a pure silica cladding. This single ring has an index of refraction, which is lower than that of the cladding.

In another illustrative embodiment, an optical fiber having negative chromatic dispersion is disclosed. Its dispersion slope is also about +0.043 ps/($nm^2$-km), over the wavelength region 1530–1565 nm, and its index profile comprises two annular rings of controlled-index material between a germanium-doped central core region and a pure silica cladding. The first annular ring is adjacent to the central core comprises fluorine-doped material, which has an index of refraction that is lower than that of the cladding. The second annular ring is adjacent to the cladding and comprises germanium-doped material, which has an index of refraction that is higher than that of the cladding. The second annular ring is used increase the effective area of the fiber.

Advantageously, the optical fiber of the present invention has an average transmission loss at 1550 nm that is no greater than 0.20 dB/km, and is relatively insensitive to bend loss. Moreover the optical fiber has an effective area that is greater than 50 $\mu m^2$.

BRIEF DESCRIPTION OF THE DRAWING

The invention and its mode of operation will be more clearly understood from the following detailed description when read with the appended drawing in which.

DETAILED DESCRIPTION

Background

Various mechanisms limit a fiber's bandwidth. In multimode fiber, for example, there is modal dispersion in which pulses of light that enter one end of the fiber are spread as they emerge from the other end of the fiber. This is because multimode fiber supports hundreds of different modes (paths) of a particular wavelength. And when the different modes are combined at the other end of the fiber, the net result is pulse spreading (dispersion), which is undesirable. Unless otherwise stated, dispersion means chromatic or "linear" dispersion. Conventionally, the sign of the dispersion is deemed positive in the situation wherein short-wavelength radiation has greater velocity than long-wavelength radiation.

A fiber can also be designed to support only the fundamental mode ($LP_{01}$) of a particular wavelength. Such fiber is designated "singlemode." It has a bandwidth that is much greater than multimode fiber and can transmit optical signals at proportionally greater speeds. Nevertheless, singlemode fiber will behave as though it were multimode fiber for wavelengths that are shorter than the $LP_{11}$ cutoff wavelength, which is determined by the core radius (a), the index of refraction (n), and the fractional core/cladding index difference ($\Delta$). Indeed, as $\Delta$ and a decrease, fewer and fewer modes propagate until only one mode propagates at wavelengths longer than the $LP_{11}$ cutoff wavelength. Accordingly, the $LP_{11}$ cutoff wavelength needs to be shorter than the wavelengths to be transmitted by a suitable amount.

Figure 1:
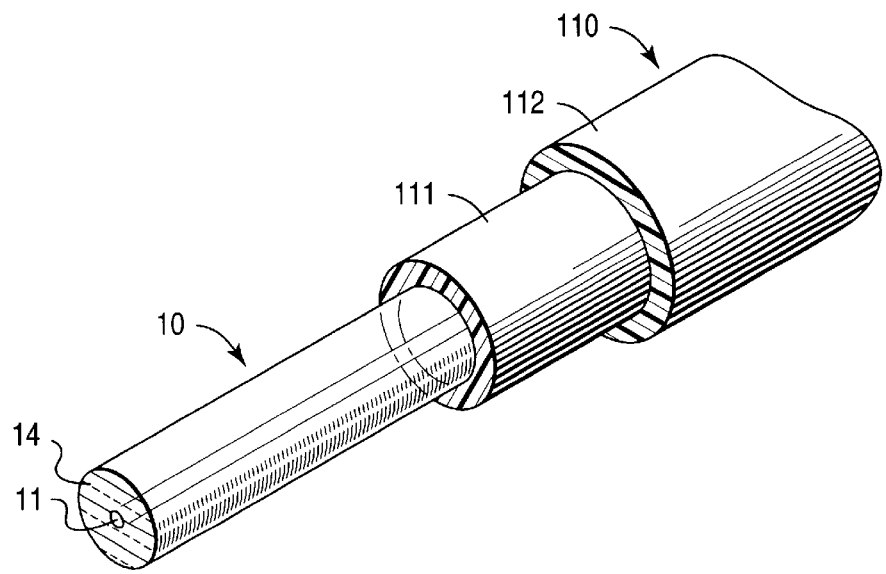
FIG. 1 is a perspective view of a know optical fiber having two protective coating layers.

In the manufacture of optical fiber, a glass preform rod is suspended vertically and moved into a furnace at a controlled rate. The preform softens in the furnace and a glass fiber is drawn freely from the molten end of the preform rod by a capstan located at the base of a draw tower. (Even though the drawn fiber has a diameter that is thousands of times smaller than the preform rod, it has the same refractive index profile!) Because the surface of the glass fiber is susceptible to damage caused by abrasion, it is necessary to coat the fiber after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to electromagnetic radiation. FIG. 1 discloses a dual-coated optical fiber 110, whose structure is suitable for use in the present invention. As shown, two layers of coating materials are applied to the drawn glass fiber 10, which comprises a light-carrying core 11 and a cladding 14. Clad fiber 10 has a diameter of about 125 $\mu$m. An inner layer 111, referred to as a primary coating material, is applied to the glass fiber 10; and an outer layer 112, referred to as a secondary coating material, is applied to the primary coating material 111. The secondary coating material generally has a relatively high modulus (e.g., $10^9$ Pa) to withstand handling, whereas the primary coating material has a relatively low modulus (e.g., $10^6$ Pa) to provide a cushion that reduces microbending losses. The secondary material may be applied while the primary coating is still wet, and then both coatings are simultaneously cured by radiation in the ultraviolet region of the electromagnetic spectrum.

Figure 2:
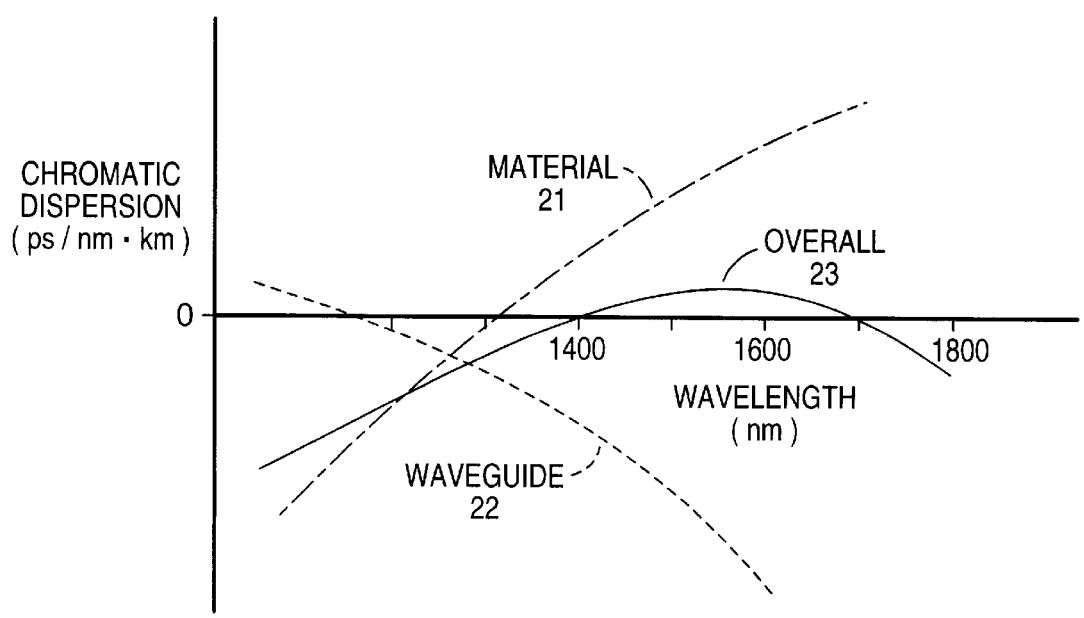
FIG. 2 is a graph of the overall chromatic dispersion of a dispersion-flattened fiber, as a function of wavelength, showing its material dispersion and waveguide dispersion components.

FIG. 2 illustrates the chromatic dispersion of a prior-art optical fiber and, more particularly, how an overall dispersion-flattened characteristic 23 is created through the additive combination of material and waveguide dispersion components. (Dispersion-flattened fibers generally have zero dispersion at two wavelengths—e.g., 1400 nm and 1700 nm.) Recall that material dispersion is intrinsically associated with the actual material used in making the optical fiber. Here, material dispersion 21 is associated with silica glass. Waveguide dispersion 22, on the other hand, is a function of the refractive-index profile shape. Unlike material dispersion, waveguide dispersion can be shaped, within limits, by the design engineer. This particular index profile has been used in the design of dispersion-flattened fibers wherein the chromatic dispersion is reduced over the broad wavelength region extending from 1400–1700 nm. Examples of dispersion-flattened fibers are shown in U.S. Pat. Nos. 4,372,647 and 4,435,040.

Figure 3A:
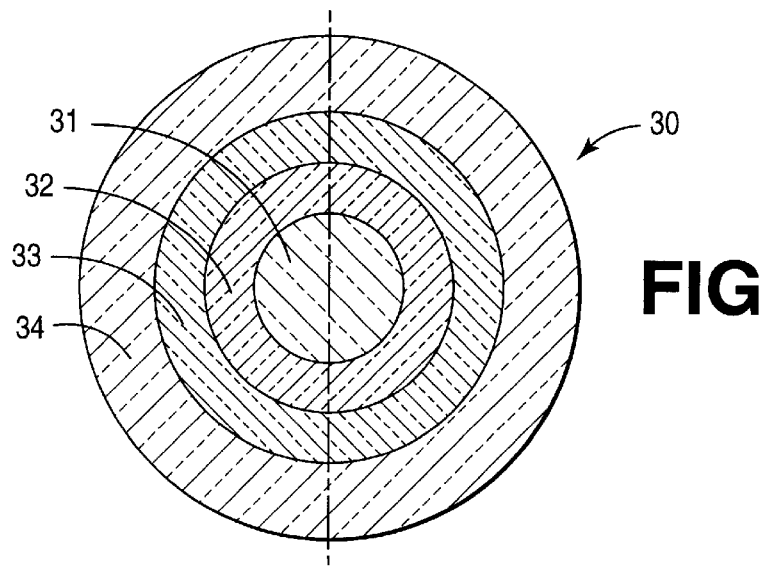
FIG. 3A is a cross-section view of an uncoated optical fiber showing several layers of different refractive index materials.

Reference is now made to FIG. 3A, which generally discloses a cross section of an uncoated glass fiber 30 showing a plurality of layers 31–34—each having a different index of refraction for modifying the waveguide dispersion characteristic of the fiber. FIG. 3A suggests that changes in refractive index are abrupt between layers, although this is not necessarily the case. Gradual index changes are more common and such fibers are known as graded index fibers. Nevertheless, to facilitate an understanding of the present invention, abrupt changes are shown. It is understood that the present invention contemplates graded index fibers also.

Figure 3B:
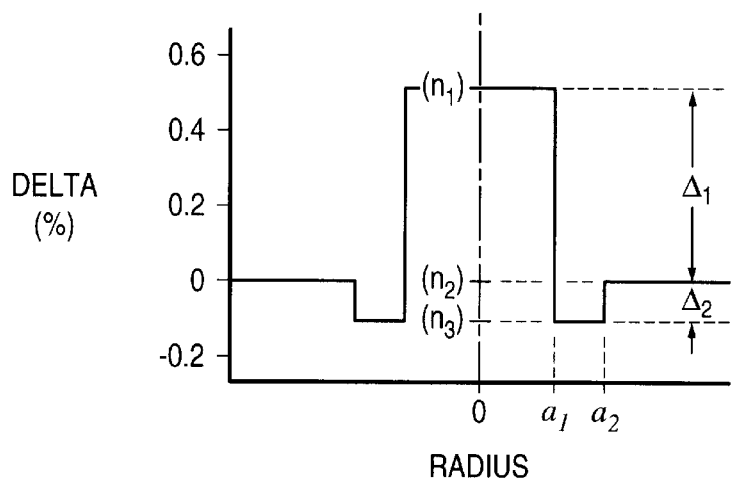
FIG. 3B discloses a refractive-index profile of a positive-dispersion fiber in accordance with the present invention.

Optical fiber 30 comprises a central core region 31 whose index of refraction is nominally $n_1$. Central core region 31 is surrounded by a first intermediate region 32 of nominal refractive index $n_3$, which in turn is surrounded by a second intermediate region 33 of nominal refractive index $n_4$. A cladding layer 34 of nominal refractive index $n_2$ surrounds the second intermediate region. It is noted that the drawing of FIG. 3A is not to scale since the diameter of cladding layer 34 is about 125 microns, while the diameter of the central core 31 is less than 7 microns. Moreover, it is noted that whereas FIG. 3A discloses four (4) separate glass layers, only three (3) are used in fabricating an refractive index profile in accordance with a first embodiment of the invention as illustrated in FIG. 3B FIG. 3B discloses a refractive-index profile of a positive-dispersion fiber in accordance with the present invention, showing its index profile as a function of normalized refractive index differences, $\Delta_1$ and $\Delta_2$, which are defined as follows:

$\Delta_1 \approx (n_1-n_2)/n_2 \times 100\%$; and $\Delta_2 \approx (n_3-n_2)/n_2 \times 100\%$ Desirable fiber qualities include low loss, low dispersion slope, and a suitably large effective area. It has been found these fiber qualities are achieved in a positive dispersion fiber over a range of values for $\Delta_1$ and $\Delta_2$ wherein:

$0.50\% < \Delta_1 < 0.60\%$; and $-0.15\% < \Delta_2 < -0.05\%$

In a specific embodiment of the invention, $\Delta_1=0.55\%$ and $\Delta_2=-0.10\%$. Also in the specific embodiment, the radius of the various layers are: $a_1=3.2$ $\mu$m and $a_2=4.7$ $\mu$m. The fiber profile disclosed in FIG. 3B comprises a germanium-doped silica core, a fluorine-doped intermediate layer, and a pure silica outer cladding. Nevertheless, it is understood that the core and the cladding layers do not need to be constructed in this manner since it is the relative difference in refractive indexes that provides the benefits of the present invention. For example, the core can be made from pure silica, while the intermediate layer and the cladding can have different levels of fluorine doping.

The specification table for a positive-dispersion fiber, suitable for use in the present invention, has been developed. However, it is not intended to define the entire range of acceptable fibers and is presented for illustrative purposes only.

| | |
|---|---|
| Attenuation at 1550 nm | ≦0.20 dB/km (average) |
| Mode field diameter | 8.4 ± 0.6 microns (1550 nm) |
| Core eccentricity | <0.8 microns |
| Cladding diameter | 125 ± 1.0 micron |
| Cutoff wavelength | <1450 nm (2m reference length) |
| Dispersion | >+0.8 ps/(nm-km) (1530–1565 nm) |
| Dispersion slope | <+0.043 ps/(nm²-km) (average) |
| Macrobending | <0.5 dB at 1550 nm (1 turn, 32 mm) |
| Macrobending | <0.05 dB at 1550 nm (100 turns, 75 mm) |
| Coating diameter | 245 ± 10 microns |
| Proof test | 100 kpsi |

Figure 3C:
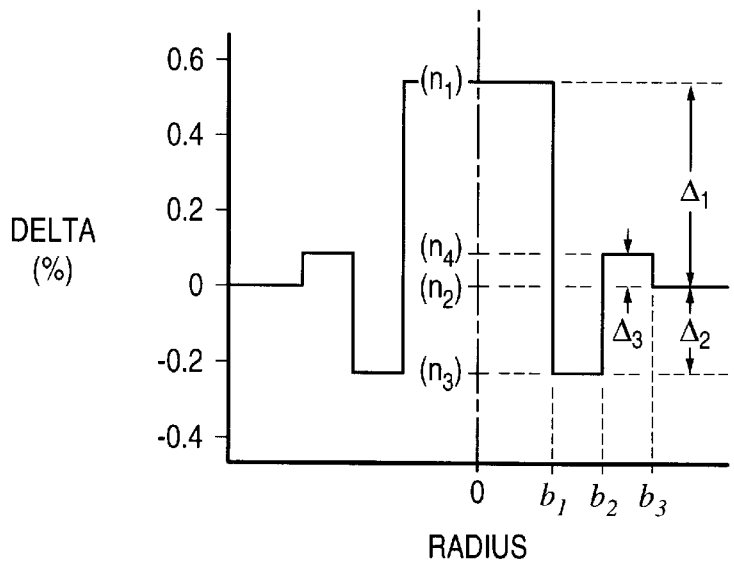
FIG. 3C discloses a refractive-index profile of a negative-dispersion fiber in accordance with the present invention.

FIG. 3C discloses a refractive-index profile of a negative-dispersion fiber in accordance with the present invention. It has been found the desired fiber qualities are achieved in a negative dispersion fiber over a range of values for $\Delta_1$ and $\Delta_2$ wherein:

$0.60 < \Delta_1 < 0.70$;
$-0.30 < \Delta_2 < -0.10$; and
$0.05 < \Delta_3 < 0.25$ In a specific embodiment of the invention, $\Delta_1=0.65$, $\Delta_2=-0.25$, and $\Delta_3=0.10$. Also in the specific embodiment, the radius of the various layers are: $b_1=3.4$ $\mu$m; $b_2=5.2$ $\mu$m; and $b_3=7.2$ $\mu$m. The fiber profile disclosed in FIG. 3C comprises a germanium-doped silica core, a fluorine-doped first intermediate layer, a germanium-doped second intermediate layer, and a pure silica outer cladding. Nevertheless, it is understood that the core and the cladding layers do not need to be constructed in this manner since it is the relative difference in refractive indexes that provides the benefits of the present invention. For example, the core can be made from pure silica, while the intermediate layers and the cladding can have different levels of fluorine doping.

A specification table for a negative-dispersion fiber, suitable for use in the present invention, has been developed. However, it is not intended to define the entire range of acceptable fibers and is presented for illustrative purposes only.

| | |
|---|---|
| Attenuation at 1550 nm | ≦0.20 dB/km (average) |
| Mode field diameter | 8.4 ± 0.6 microns (1550 nm) |
| Core eccentricity | <0.8 microns |
| Cladding diameter | 125 ± 1.0 micron |
| Cutoff wavelength | <1450 nm (2m reference length) |
| Dispersion | <-0.8 ps/(nm-km) (1530–1565 nm) |
| Dispersion slope | <+0.043 ps/(nm²-km) (average) |
| Macrobending | <0.5 dB at 1550 nm (1 turn, 32 mm) |
| Macrobending | <0.05 dB at 1550 nm (100 turns, 75 mm) |
| Coating diameter | 245 ± 10 microns |
| Proof test | 100 kpsi |

Detailed descriptions of suitable procedures for fabrication are readily available. Preforms may be monolithic or composite. Core regions are preferably formed by Modified Chemical Vapor Deposition or by one of the processes using soot chemistry—Outside Vapor Deposition or Vapor Axial Deposition. Known procedures (e.g., for cladding, overcladding, coating, cabling, etc.) are unaffected by the fiber design.

Figure 4:
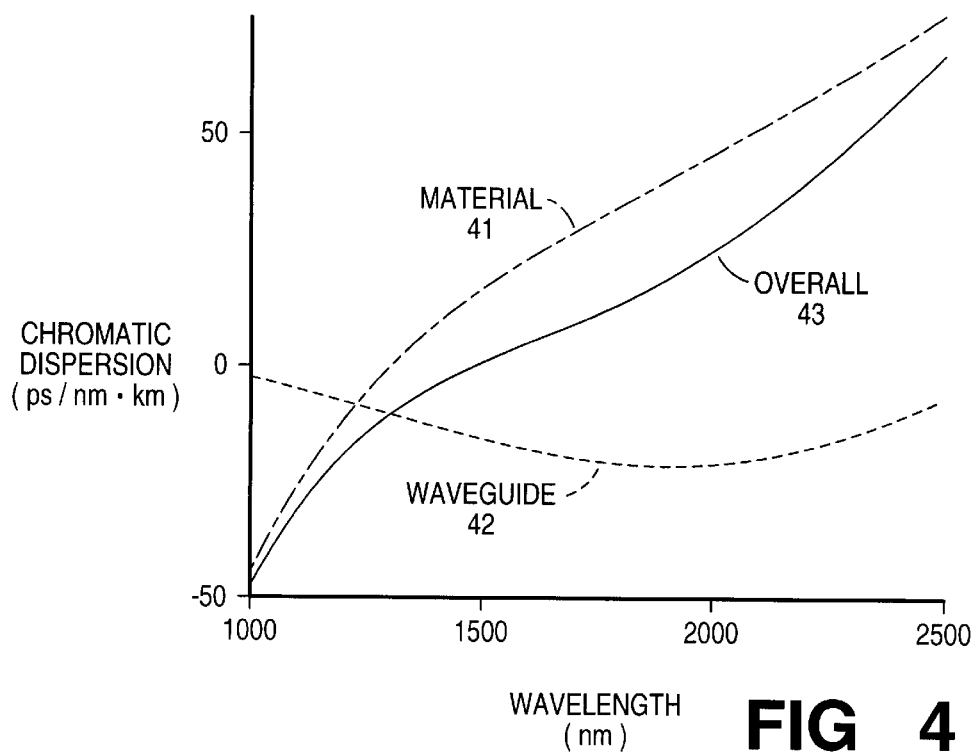
FIG. 4 is a graph of the chromatic dispersion of a fiber in accordance with the present invention, as a function of wavelength, showing its material dispersion and waveguide dispersion components.

FIG. 4 discloses the chromatic dispersion characteristic 43 of an optical fiber in accordance with the present invention. In particular, it discloses how a low dispersion slope is created through the additive combination of material and waveguide dispersion components 41, 42 respectively. Although the waveguide dispersion curve 22 in FIG. 2 for a dispersion-flattened fiber also exhibits a negative slope, waveguide dispersion increases rapidly at long wavelengths in order to create the second dispersion null (shown at 1700 nm) and a flat overall dispersion curve 23. However, such flattening is actually caused as the fundamental mode starts to effectively cutoff, and this leads to undesirably high bending loss.

Figure 5:
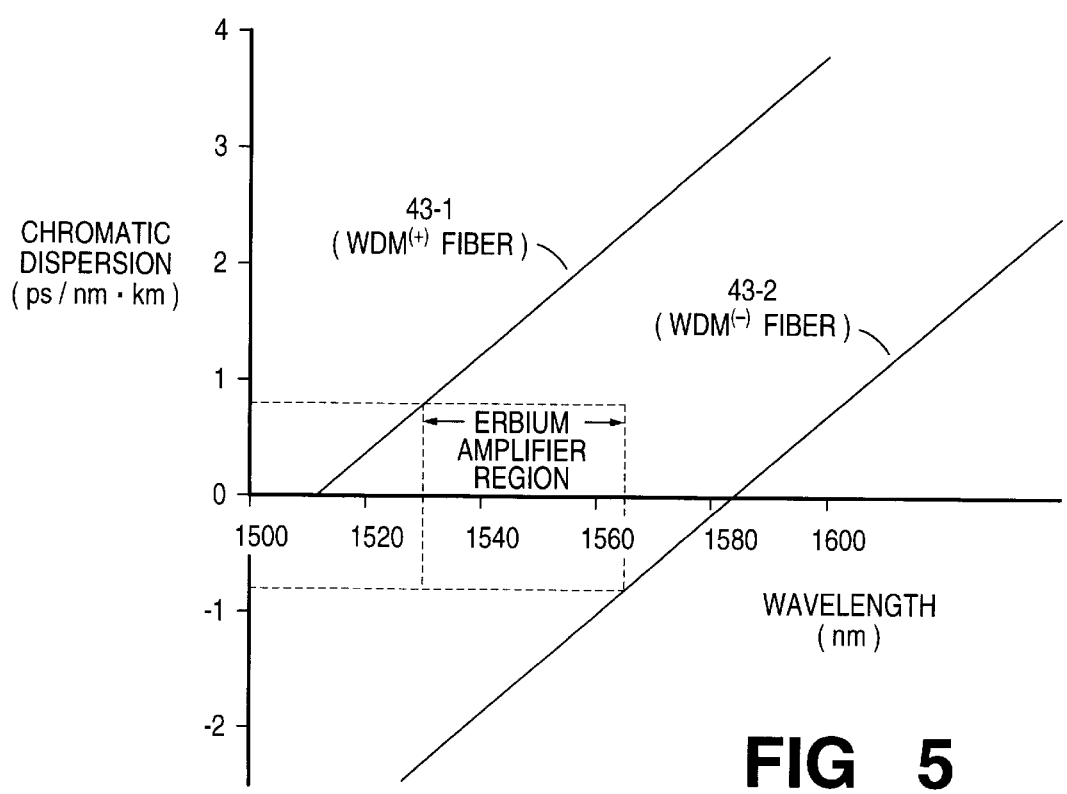
FIG. 5 is a graph of the chromatic dispersion of a positive-dispersion fiber and a negative-dispersion fiber of the present invention, showing their characteristics with greater detail in the Erbium amplifier region.

FIG. 5 is a graph of the chromatic dispersion of a positive-dispersion fiber 43-1 having the refractive index profile shown in FIG. 3B, and a negative-dispersion fiber 43-2 having the refractive index profile shown in FIG. 3C. Each of these fibers has a loss that is no greater than 0.20 dB/km at 1550 nm; an effective area that is greater than 50 $\mu$m²; and each of these fibers has a dispersion whose absolute magnitude is greater than 0.8 ps (nm-km) in the wavelength region (1530–1565 nm) served by Erbium-doped fiber amplifiers. More importantly, each of these fibers has a dispersion slope of about 0.043 dB/(nm²-km) at 1550 nm. These characteristics render the fibers 43-1, 43-2 ideal for use in the transmission of WDM signals where low loss and a small amount of dispersion across the Erbium amplifier region is desirable. (By way of contrast, an unshifted silica fiber is one having a dispersion null point, $\lambda_0$, at about 1310 nm, a dispersion of about +17 ps/(nm-km) at 1550 nm, and a dispersion slope of about 0.095 ps/(nm²-km) at 1550 nm.)

Figure 6:
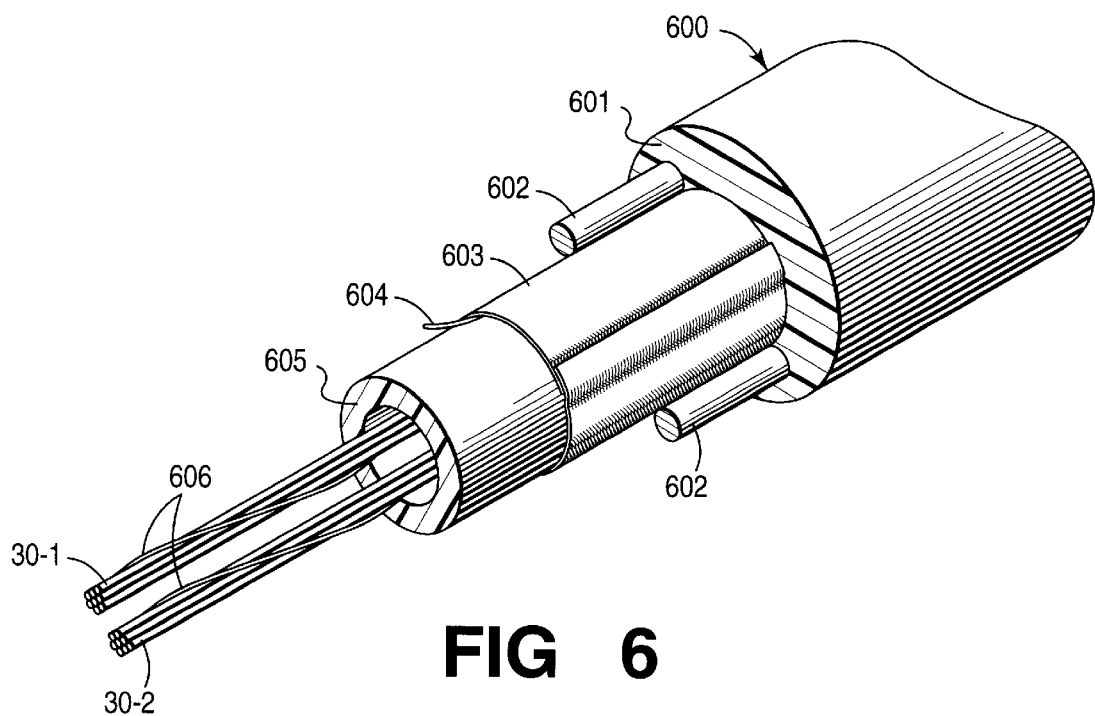
FIG. 6 is a perspective view of a cable containing groups of optical fibers in accordance with the invention.

FIG. 6 provides greater detail regarding the construction of a practical cable according to the present invention. Optical cable 600 includes two bundles of optical fibers that are loosely wrapped with a yarn binder 606 to form an identifiable unit. One of the bundles preferably includes positive-dispersion fibers 30-1, while the other bundle preferably includes negative-dispersion fibers 30-2—as discussed in U.S. Pat. No. 5,611,016. And while it is preferable to segregate positive-and negative-dispersion fibers into separate groups or units, it is not necessary in the practice of the invention. These bundles are disposed within a tubular member 605 which is made from a dielectric material such as polyvinyl chloride or polyethylene, for example. Surrounding tubular member 605 is a sheath system that includes: a water-absorbing tape 603; a plastic jacket 601, which is illustratively made from a polyethylene material; and strength members 602—602, which are illustratively made from steel or epoxy-impregnated glass fibers. The strength members are used to eliminate or reduce stresses that might otherwise be applied to the optical fibers during handling or normal service, and may be included within the cable 600 in any number of known ways. A rip cord 604, made of Kevlar® plastic, facilitates removal of the entire sheath system 601–603. Typically, a filling material is disposed within the tubular member 605 that serves to cushion the fibers contained therein, thereby protecting them against microbending loss.

Figure 7:
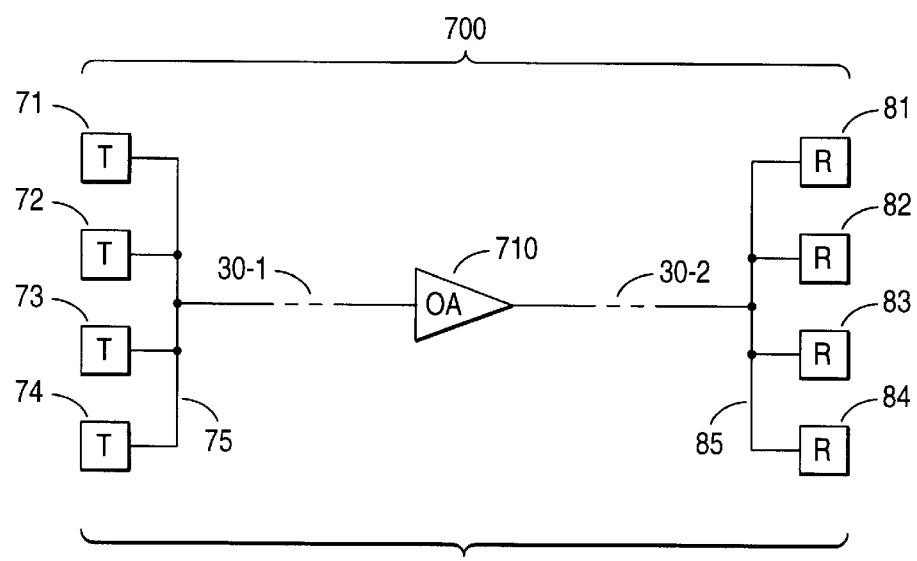
FIG. 7 discloses a four-channel WDM system operating over a transmission path containing positive and negative dispersion fibers as well as an Erbium-doped fiber amplifier.

FIG. 7 discloses a WDM system 700 in accordance with the invention. It consists of four transmitters 71–74 which modulate four predetermined wavelengths in the 1530–1565 nm region with four different baseband signals. The modulated wavelengths are then combined via a passive 4:1 coupler 75 and introduced into a fiber transmission line 30-1, 30-2 that includes an optical amplifier 710—preferably an Erbium-doped fiber amplifier. In the embodiment of FIG. 7, fiber transmission line 30-1 comprises a predetermined length of positive-dispersion fiber while fiber transmission line 30-2 comprises a predetermined length of negative-dispersion fiber. At the receiver end, the four-channels are split by demultiplexer 85, according to their wavelengths, and processed by receivers 81–84 to extract the individual baseband signals.

Although various particular embodiments have been shown and described, modifications are possible within the spirit and scope of the invention. These modifications include, but are not limited to, refractive-index profiles that gradually taper between adjacent layers (e.g., graded-index profiles); variations in the widths of the layers; the use of different doping materials to achieve the same general profile shapes; and the use of plastic materials, rather than glass, in making the optical fiber. It is noted that in many practical fibers, an index depression exists at the center of the fiber due to the manufacturing process used in making the fiber. It is understood that even though FIG. 3B and 3C show idealized profiles, the present invention contemplates such central depressions.

I claim:

1. An optical fiber having a chromatic dispersion whose absolute magnitude is greater than about 0.8 ps/(nm-km) for all wavelengths within the region 1530–1565 nm, the optical fiber comprising a core of transparent material having a maximum refractive index $n_1$, and a layer of transparent cladding material on the outer surface of said core having a minimum refractive index of $n_2$

CHARACTERIZED IN THAT the core includes an annular region of transparent material whose refractive index, $n_3$, wherein $n_1 > n_2 > n_3$ and
$0.50 < (n_1 - n_2)/n_2 < 0.70$; and
$-0.30 < (n_3 - n_2)/n_2 < -0.05$.

2. The optical fiber of claim 1 wherein the optical fiber has a dispersion slope that is less than 0.05 ps/(nm$^2$-km) over the wavelength region 1530–1565 nm.

3. The optical fiber of claim 2 wherein the optical fiber has a dispersion slope that is 0.043±0.005 ps/(nm$^2$-km) over the wavelength region 1530–1565 nm.

4. The optical fiber of claim 1 wherein the chromatic dispersion is greater than +0.8 ps/(nm-km) in the wavelength region 1530–1565, and wherein
$0.50 < (n_1 - n_2)/n_2 < 0.60$; and
$-0.15 < (n_3 - n_2)/n_2 < -0.05$.

5. The optical fiber of claim 1 wherein the chromatic dispersion is more negative than −0.8 ps/(nm-km) in the wavelength region 1530–1565, and wherein
$0.60 < (n_1 - n_2)/n_2 < 0.70$; and
$-0.30 < (n_3 - n_2)/n_2 < -0.20$.

6. The optical fiber of claim 1 wherein the fiber is encompassed within a sheath system that includes a plastic jacket, thereby defining an optical cable.

7. A silica-based optical waveguide fiber having a material dispersion, and having a refractive-index profile preselected to generate a negative waveguide dispersion such that the overall dispersion of said fiber, equal to the sum of said material dispersion and said waveguide dispersion, has a slope that is less than 0.05 ps/(nm$^2$-km), and has a chromatic dispersion that is greater than about +0.8 ps/(nm-km) at a given wavelength within the region 1530–1565 nm.

8. The fiber of claim 7 comprising a centrally disposed core surrounded by cladding glass, said fiber comprising the following regions named in order of increasing radius: (i) a central core region of refractive index $n_1$, (ii) an intermediate region of refractive index $n_3$, and (iii) a cladding glass of refractive index $n_2$, wherein $n_1 > n_2 > n_3$.

9. The fiber of claim 8 wherein
$0.50 < (n_1 - n_2)/n_2 < 0.60$; and
$-0.15 < (n_3 - n_2)/n_2 < -0.05$.

10. A silica-based optical waveguide fiber having a material dispersion, and having a refractive-index profile preselected to generate a negative waveguide dispersion such that the overall dispersion of said fiber, equal to the sum of said material dispersion and said waveguide dispersion, has a slope that is less than 0.05 ps/(nm$^2$-km), and has a chromatic dispersion that is more negative than about −0.8 ps/(nm-km) at a given wavelength within the region 1530–1565 nm, said fiber attenuating light transmitted along its length, the attenuation of said fiber at 1550 nm being no greater than 0.20 dB/km.

11. The fiber of claim 10 comprising a centrally disposed core surrounded by cladding glass, said fiber comprising the following regions named in order of increasing radius: (i) a central core region of refractive index $n_1$, (ii) a first intermediate region of refractive index $n_3$, (iii) a second intermediate region of refractive index $n_4$, and (iv) a cladding glass of refractive index $n_2$, wherein $n_1 > n_4 > n_2 > n_3$.

12. The fiber of claim 11 wherein
$0.60 < (n_1 - n_2)/n_2 < 0.70$; and
$-0.30 < (n_3 - n_2)/n_2 < -0.20$.

13. The fiber of claim 12 wherein
$0.05 < (n_4 - n_2)/n_2 < 0.25$.

14. A communications cable comprising a plurality of optical fibers enclosed within a sheath system that includes a plastic jacket, each of said fibers having an overall chromatic dispersion whose magnitude exceeds +0.8 ps/(nm-km) over the entire wavelength region 1530–1565 nm

CHARACTERIZED IN THAT each of the plurality of fibers has a refractive-index profile preselected to generate a negative waveguide dispersion component such that the overall dispersion of said fiber, equal to the sum of a material dispersion component and the waveguide dispersion component, has a slope that is less than 0.05 ps/(nm$^2$-km), and a loss that is no greater than 0.20 dB/km at 1550 nm.

15. A communications cable comprising a plurality of optical fibers enclosed within a sheath system that includes a plastic jacket, each of said fibers having an overall chromatic dispersion whose absolute magnitude exceeds 0.8 ps/(nm-km) in the wavelength region 1530–1565 nm CHARACTERIZED IN THAT each of the plurality of fibers includes a core of transparent material having a maximum refractive index $n_1$, and a layer of transparent cladding material on the outer surface of said core having a refractive index of $n_2$; and each of said cores includes an annular region of transparent material whose minimum refractive index is $n_3$, wherein $n_1 > n_2 > n_3$ and $0.50 < (n_1 - n_2)/n_2 < 0.70$; and $-0.30 < (n_3 - n_2)/n_2 < -0.05$.

16. A wave-division-multiplex (WDM) system comprising:

plural sources of optical signals modulated at different wavelengths within the region 1530–1565 nanometers;

apparatus for multiplexing the optical signals at the input of the WDM system;

apparatus for demultiplexing the optical signals at the output of the WDM system;

a transmission path extending between the multiplexing apparatus and the demultiplexing apparatus, said path including a first optical fiber having a chromatic dispersion whose absolute magnitude is greater than about 0.8 ps/(nm-km) for all wavelengths within the region 1530–1565 nm, the optical fiber comprising a core of transparent material having a maximum refractive index $n_1$, and a layer of transparent cladding material on the outer surface of said core having a refractive index of $n_2$, said core including an annular region of transparent material whose minimum refractive index is $n_3$, wherein $n_1 > n_2 > n_3$ and $0.50 < (n_1 - n_2)/n_2 < 0.70$; and $-0.30 < (n_3 - n_2)/n_2 < -0.05$.

17. The WDM system of claim 16 wherein the transmission path further includes an optical amplifier.

18. The WDM system of claim 17 wherein the optical amplifier comprises an Erbium-doped fiber amplifier.

19. The WDM system of claim 16 wherein the transmission path further includes a second optical fiber, connected in series with the first optical fiber, the second optical fiber having a chromatic-dispersion characteristic whose slope is approximately equal to the slope of the first optical fiber, but whose magnitude is opposite in sign to the magnitude of the first optical fiber within the wavelength region 1530–1565 nm.

\* \* \* \* \*